(12) United States Patent
Lee et al.

(10) Patent No.: US 12,526,945 B2
(45) Date of Patent: Jan. 13, 2026

(54) STORAGE DEVICE

(71) Applicant: SAMSUNG ELECTRONICS CO., LTD., Suwon-si (KR)

(72) Inventors: Kyoung Eun Lee, Hwaseong-si (KR); Hyun Joon Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 353 days.

(21) Appl. No.: 18/093,581

(22) Filed: Jan. 5, 2023

(65) Prior Publication Data

US 2023/0292449 A1 Sep. 14, 2023

(30) Foreign Application Priority Data

Mar. 10, 2022 (KR) ........................ 10-2022-0030244

(51) Int. Cl.
*G06F 3/06* (2006.01)
*G01L 1/22* (2006.01)
*H05K 5/00* (2006.01)
*H05K 5/02* (2006.01)
*H05K 5/10* (2025.01)

(52) U.S. Cl.
CPC .............. *H05K 5/10* (2025.01); *G01L 1/2262* (2013.01); *H05K 5/0069* (2013.01); *H05K 5/0078* (2013.01); *H05K 5/0247* (2013.01); *H05K 2201/10151* (2013.01); *H05K 2201/10159* (2013.01); *H05K 2201/10378* (2013.01)

(58) Field of Classification Search
CPC ...... H05K 5/10; H05K 5/0069; H05K 5/0078; H05K 5/0247; H05K 2201/10151; H05K 2201/10159; H05K 2201/10378; G01L 1/2262; G11C 5/04; G11C 16/3418; H01L 23/5384; H01L 25/18; G06F 3/0614; G06F 3/0629; G06F 3/0658; G06F 3/0673; G06F 3/0604
USPC ......... 374/100, 141, 142; 324/72, 72.5, 149, 324/103 R, 104, 103 P, 76.11; 73/862.623, 12.01, 29.01, 20.02, 73/335.01–335.06, 29.05, 493, 514.01, 73/514.16, 514.32–514.35, 865.8
See application file for complete search history.

(56) References Cited

U.S. PATENT DOCUMENTS 8,458,804 B1 *  6/2013  Hyde ..................... G11C 5/005
                                                    726/26
9,633,872 B2 *  4/2017  Chen ....................... H01L 25/18
9,888,561 B2    2/2018  Perkins et al.
(Continued)

FOREIGN PATENT DOCUMENTS

KR   10-2015-0106218 A       9/2015
WO   WO-2022271141 A1 *  12/2022

*Primary Examiner* — Robert R Raevis
(74) *Attorney, Agent, or Firm* — Sughrue Mion, PLLC

(57) ABSTRACT

In some embodiments, a storage device includes a printed circuit board, a memory device coupled to the printed circuit board, a storage controller which controls the memory device and is coupled to the printed circuit board, an active interposer including a logic element coupled to the printed circuit board, a sensor disposed inside the active interposer and configured to sense an impact and provide a sensor signal of the impact to the storage controller, and a strain gauge disposed inside the active interposer and configured to measure a physical strain and provide a signal about the physical strain to the storage controller.

19 Claims, 12 Drawing Sheets

(56) References Cited

U.S. PATENT DOCUMENTS

| | | |
|---|---|---|
| 10,109,617 B2 | 10/2018 | Lee et al. |
| 2019/0241428 A1* | 8/2019 | Mitchell ............... B81B 7/0048 |

* cited by examiner

FIG. 11

| SHOCK LEVEL | MODE |
|---|---|
| level 1 | host inform |
| level 2 | host inform → Controller Shock adjusting mode |
| level 3 | host inform → Change Mode of Memory device |
| level 4 | Power off |

STORAGE DEVICE

CROSS-REFERENCE TO RELATED APPLICATION

This application claims priority under 35 U.S.C. § 119 to Korean Patent Application No. 10-2022-0030244, filed on Mar. 10, 2022, in the Korean Intellectual Property Office, the disclosure of which is incorporated by reference herein in its entirety.

BACKGROUND

1. Field

The present disclosure relates to a storage device.

2. Description of Related Art

A memory device represented by a solid state drive (SSD) may be widely used not only in a traditional electronic apparatus such as a storage device used in a desktop personal computer (PC), a tablet PC, a laptop PC, a server and/or a data center, but also in an electronic device related to mobility such as a smartphone, an automobile, a drone, and/or an aircraft. The memory device may be exposed to various shocks during internal operation of the electronic device. For example, the memory device may be exposed to a wide temperature range, a wide humidity range, mechanical shocks, electrical shocks due to anomalous currents and/or voltages, and the like. Such exposures and/or impacts may threaten the reliability of the memory device.

SUMMARY

Aspects of the present disclosure provide a storage device having improved product reliability.

According to an aspect of the present disclosure, a storage device is provided. The storage device includes a printed circuit board, a memory device coupled to the printed circuit board, a storage controller which controls the memory device and is coupled to the printed circuit board, an active interposer including a logic element coupled to the printed circuit board, a sensor disposed inside the active interposer, configured to sense an impact, and provide a sensor signal of the impact to the storage controller, and a strain gauge disposed inside the active interposer, configured to measure a physical strain and provide a signal about the physical strain to the storage controller.

In some embodiments, the active interposer includes a chiplet including the sensor.

In some embodiments, the active interposer includes a Wheatstone bridge circuit, and the strain gauge is configured to measure the physical strain using the Wheatstone bridge circuit.

In some embodiments, the sensor is further configured to provide the sensor signal to the storage controller, based on a level of the sensed impact being equal to or higher than a threshold value.

In some embodiments, the sensor includes at least one of a thermal sensor, a voltage sensor, a current sensor, a humidity sensor, a mechanical impact sensor, and an acceleration sensor.

In some embodiments, the active interposer includes a through-silicon via that couples the printed circuit board, the memory device, and the storage controller.

In some embodiments, the storage controller is configured to provide a first signal notifying the impact to a host and do not switch a mode of the memory device, in response to a level of impact indicated by the sensor signal provided from the sensor being a first level, and the storage controller is further configured to provide a second signal notifying the impact to the host, and switch the mode of the memory device, in response to the level of impact indicated by the sensor signal provided from the sensor being a second level different from the first level.

In some embodiments, the second level includes a third level and a fourth level, the storage controller is further configured to adjust an operating speed of the memory device, in response to the level of impact indicated by the sensor signal provided from the sensor being the third level, and the storage controller is further configured to control the memory device to operate in a read-only mode, in response to the level of impact indicated by the sensor signal provided from the sensor being the fourth level.

In some embodiments, the second level further includes a fifth level, the storage controller is further configured to shut off power of the memory device, in response to the level of impact indicated by the sensor signal provided from the sensor being the fifth level.

In some embodiments, the active interposer is disposed on the printed circuit board.

In some embodiments, the active interposer is mounted inside the printed circuit board.

According to an aspect of the present disclosure, a storage device is provided. The storage device includes a printed circuit board, a first memory device, a second memory device, a storage controller configured to control the first memory device and the second memory device, an active interposer which couples the storage controller, the first memory device, the second memory device, and the printed circuit board, a first sensor which is closer to the first memory device than the second memory device and mounted inside the active interposer, a second sensor which is closer to the second memory device than the first memory device and mounted inside the active interposer, and a strain gauge which is placed inside the active interposer and configured to measure a physical strain. The first sensor and the second sensor include at least one of a thermal sensor, a voltage sensor, a current sensor, a humidity sensor, a mechanical impact sensor, and an acceleration sensor. The storage controller is configured to control an operation of the first memory device, in response to a first sensor signal provided from the first sensor. The storage controller is configured to control an operation of the second memory device, in response to a second sensor signal provided from the second sensor.

In some embodiments, the active interposer includes a Wheatstone bridge circuit, and the strain gauge is further configured to measure the physical strain using the Wheatstone bridge circuit.

In some embodiments, the strain gauge is configured to provide the storage controller with a strain signal of the physical strain, and the storage controller is configured to switch, in response to the strain signal, a first mode of the first memory device and a second mode of the second memory device.

In some embodiments, the strain gauge is located at an edge portion of the active interposer.

According to an aspect of the present disclosure, a storage device is provided. The storage device includes a package substrate, a first semiconductor chip coupled to the package substrate, a second semiconductor chip coupled to the package substrate, a third semiconductor chip coupled to the package substrate, an active interposer which couples the first semiconductor chip, the second semiconductor chip, and the third semiconductor chip with the package substrate using a through-silicon via, a sensor which is mounted inside the active interposer as a chiplet structure and configured to sense an impact, and a strain gauge which is mounted inside the active interposer and configured to measure a physical strain using a Wheatstone bridge circuit. The sensor is further configured to provide a sensor signal of the sensed impact to the third semiconductor chip. The strain gauge is further configured to provide a strain signal of the measured physical strain to the third semiconductor chip. The third semiconductor chip is further configured to control operation of the first semiconductor chip, the second semiconductor chip, and the third semiconductor chip, in response to the sensor signal and the strain signal.

In some embodiments, the third semiconductor chip includes a storage controller configured to control the first semiconductor chip, the second semiconductor chip, and the third semiconductor chip, depending on a level of the impact and a level of the physical strain according to the sensor signal and the strain signal.

In some embodiments, the first semiconductor chip includes a volatile memory, the second semiconductor chip includes a non-volatile memory, the third semiconductor chip includes a storage controller configured to control the first semiconductor chip and the second semiconductor chip, and to store data about the physical strain in the volatile memory, in response to the strain signal of the physical strain.

In some embodiments, the first semiconductor chip is placed on a first surface of the package substrate, and the second semiconductor chip and the third semiconductor chip are placed on a second surface opposite to the first surface of the package substrate.

In some embodiments, the strain gauge is located at an edge portion of the active interposer.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

BRIEF DESCRIPTION OF DRAWINGS

The above and other aspects and features of the present disclosure will become more apparent by describing in detail exemplary embodiments thereof with reference to the attached drawings, in which:

FIG. 11 is a diagram for explaining the operation of the storage device according to some embodiments.

DETAILED DESCRIPTION

Figure 1:
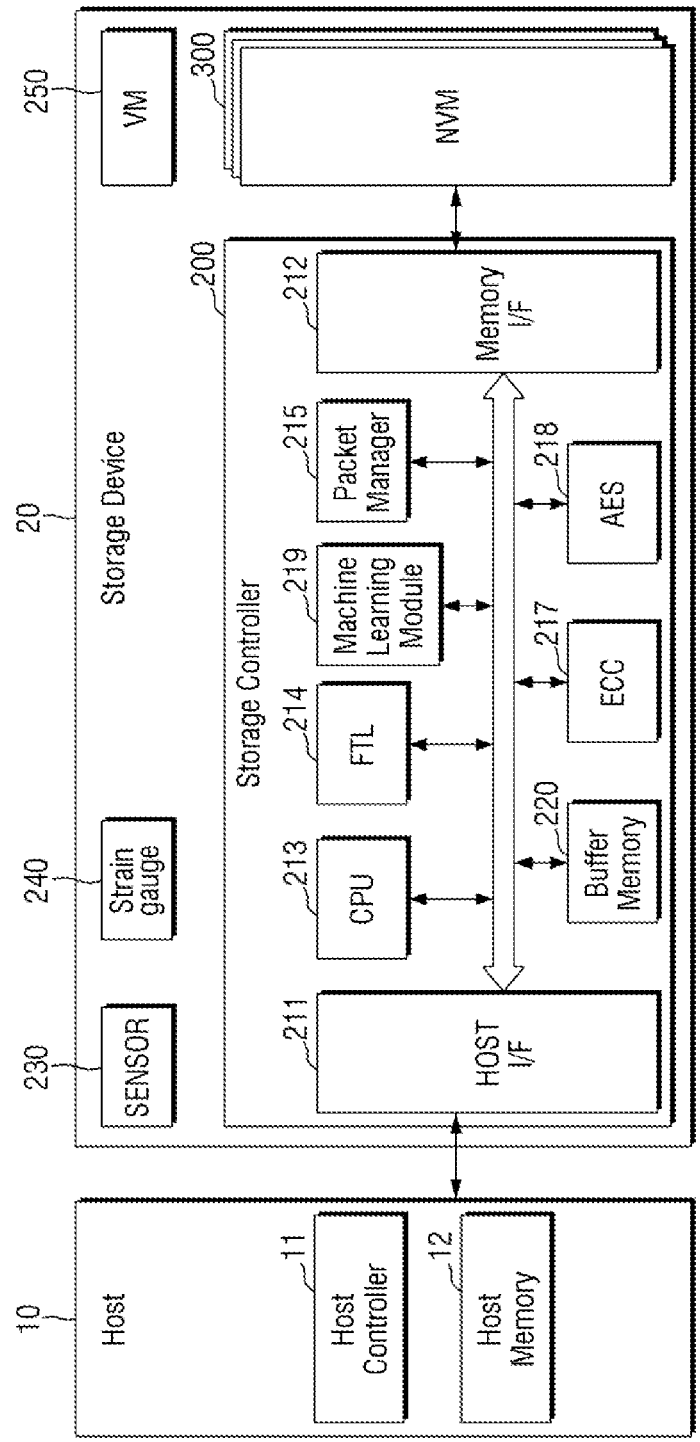
FIG. 1 is a block diagram which shows a memory system according to some embodiments.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art will recognize that various changes and modifications of the embodiments described herein can be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

FIG. 1 is a block diagram which shows a memory system according to some embodiments.

Referring to FIG. 1, a memory system 1 may include a host device 10 and a storage device 20.

In some embodiments, the host device 10 may include a host controller 11 and a host memory 12. The host memory 12 may function as a buffer memory for temporarily storing data to be transmitted to the storage device 20 or data transmitted from the storage device 20.

The storage device 20 may include a storage controller 200, a buffer memory 220, a non-volatile memory (NVM) 300, and a volatile memory (VM) 250. The storage device 20 may include a sensor 230 and a strain gauge 240. According to the embodiment, the storage device 20 may include one or more non-volatile memories 300. For example, the storage device 20 may include a plurality of NVMs 300. The volatile memory (VM) 250 may operate as a buffer memory.

The storage device 20 may include storage medium for storing data in response to a request from the host device 100. For example, the storage device 20 may include at least one of a solid state drive (SSD), an embedded memory, and a detachable external memory. For example, if the storage device 20 is the SSD, the storage device 20 may be, for example, a device that complies with a non-volatility memory express (NVMe) standard.

For another example, if the storage device 20 is an embedded memory and/or an external memory, the storage device 20 may be a device that complies with an universal flash storage (UFS) and/or an embedded multi-media card (eMMC) standard. The host device 10 and the storage device 20 may each generate and transmit packets according to the adopted standard protocol (e.g., Transmission Control Protocol/Internet Protocol (TCP/IP)).

In some embodiments, the non-volatile memory 300 of the storage device 20 may include a flash memory, such as, but not limited to, a 2D NAND memory array and/or a 3D (or vertical) NAND (VNAND) memory array. As another example, the storage device 20 may include different various types of non-volatile memories. For example, the storage device 20 may include a magnetic random-access memory (MRAM), a spin-transfer torque MRAM, a conductive bridging random-access memory (CBRAM), a ferroelectric random-access memory (FeRAM), a phase random-access memory (PRAM), a resistive random-access memory (Resistive RAM), and the like.

In some embodiments, the host controller 11 and the host memory 12 may be implemented as separate semiconductor chips. In other embodiments, the host controller 11 and the host memory 12 may be integrated on the same semiconductor chip. As an example, the host controller 11 may be one of a plurality of modules provided in the application processor, and such an application processor may be implemented as a system on chip (SoC). Further, the host memory 12 may be an embedded memory provided inside the application processor, or a non-volatile memory or a memory module placed outside the application processor.

The host controller 11 may manage an operation that stores the data (e.g., write data) of a buffer region in the non-volatile memory 300 and/or reads the data (e.g., read data) of the non-volatile memory 300 in the buffer region.

The storage controller 200 may include a host interface 211, a memory interface 212, and a central processing unit (CPU) 213. Alternatively or additionally, the storage controller 200 may include a flash translation layer (FTL) 214, a packet manager 215, an error correction code (ECC) engine 217, and an advanced encryption standard (AES) engine 218.

The storage controller 200 may further include a working memory (not shown) into which the FTL 214 is loaded, and when the CPU 213 executes the FTL 214, the data write and read operations of the non-volatile memory may be controlled.

The host interface 211 may transmit and receive packets to and/or from the host device 10. The packets transmitted from the host device 10 to the host interface 211 may include a command, data to be written in the non-volatile memory 300, or the like. The packets transmitted from the host interface 211 to the host device 10 may include a response to the command, data that is read from the non-volatile memory 300 or the like.

The memory interface 212 may transmit the data to be written in the non-volatile memory 300 to the non-volatile memory 300 and/or receive the data that is read from the non-volatile memory 300. Such a memory interface 212 may be implemented to comply with standard protocols such as, but not limited to, Toggle or Open NAND Flash Interface Working Group (ONFi).

The flash translation layer 214 may perform various functions such as address mapping, wear-leveling, and garbage collection. The address mapping operation may refer to an operation of changing a logical address received from a host into a physical address which is used for storing the data in the non-volatile memory 300. The wear-leveling may refer to a technique for ensuring that blocks in the non-volatile memory 300 are used uniformly to prevent an excessive degradation of a particular block, and may be implemented, for example, through a firmware technique for balancing the erasure counts of the physical blocks. The garbage collection may refer to a technique for ensuring an available capacity in the non-volatile memory 300 through a method of copying the valid data of the block to a new block and then erasing the existing block.

The packet manager 215 may generate a packet according to the protocol of the interface discussed with the host device 10, and/or may parse various types of information from the packet received from the host device 10

The ECC engine 217 may perform error detection and correction functions on the read data that are read from the non-volatile memory 300. For example, the ECC engine 217 may generate parity bits for the write data to be written on the non-volatile memory 300, and the parity bits thus generated may be stored in the non-volatile memory 300 together with the write data. When the data are read from the non-volatile memory 300, the ECC engine 217 may correct an error of the read data, using the parity bits that are read from the non-volatile memory 300, together with the read data, and may output the read data with a corrected error.

The AES engine 218 may perform at least one of an encryption operation and a decryption operation on the data which are input to the storage controller 200, using a symmetric-key algorithm.

The buffer memory 220 may temporarily store the data written in the non-volatile memory 300 and/or the data read from the non-volatile memory 300. The buffer memory 220 may include volatile memory. Alternatively or additionally, the buffer memory 220 may include non-volatile memory. In some embodiments, the buffer memory 220 may be placed outside of the storage controller 200. That is, in some embodiments, the storage controller 200 and the buffer memory 220 may be implemented as separate semiconductor chips.

The sensor 230 may sense an impact inside the storage device 20. That is, the sensor 230 may sense an impact that affects the storage device 20. The impact sensed in the storage device 20 by the sensor 230 may include, for example, heat, humidity, mechanical impact, electrical impact, and the like.

The sensor 230 may include a thermal sensor, a voltage sensor, a current sensor, a humidity sensor, a mechanical impact sensor, and/or an acceleration sensor. For example, if the sensor 230 includes the thermal sensor, the sensor 230 may sense heat and/or temperature of the storage device 20. That is, the sensor 230 may sense the temperature of the storage device 20. Specifically, the sensor 230 may sense an operating temperature of the storage device 20 and/or the temperature of the components included in the storage device 20 and the like.

For another example, if the sensor 230 includes a voltage sensor and/or a current sensor, the sensor 230 may sense a voltage and/or a current of the storage device 20. If the sensor 230 includes a humidity sensor, the sensor 230 may sense the humidity of the storage device 20. Alternatively or additionally, if the sensor 230 includes a mechanical impact sensor and/or an acceleration sensor, the sensor 230 may sense a mechanical impact generated on the storage device 20 and/or an acceleration generated due to the operation of the storage device 20.

The sensor 230 may provide the storage controller 200 with a sensor signal that includes information about the sensed impact. The sensor 230 may provide the storage controller 200 with a sensor signal including information about the impact when the sensed impact is equal to or greater than (e.g., exceeds) a threshold value. For example, the sensor 230 may not provide information about the sensed impact to the storage controller 200 if or when the sensed impact does not exceed the threshold value. The sensor 230 may provide the storage controller 200 with a sensor signal including information about the impact, if or when an impact equal to or greater than the threshold value is sensed.

The sensor signal provided by the sensor 230 to the storage controller 200 may include information about a level of impact sensed by the sensor 230. For example, if the sensor 230 includes the thermal sensor, the sensor 230 may provide the storage controller 200 with a sensor signal indicating that the temperature range of the storage device 20 corresponds to a first range. Alternatively or additionally, the sensor 230 may provide the storage controller 200 with a sensor signal indicating that heat of storage device 20 corresponds to a first level. If the sensor 230 corresponds to the temperature sensor, the sensor 230 may provide the sensed temperature information to the storage controller 200.

In some embodiments, the sensor 230 may provide the storage controller 200 with a sensor signal indicating that the voltage, current, mechanical impact, acceleration, humidity, and the like of the storage device 20 correspond to a specific level, depending on the type of impact of the storage device 20 to be sensed.

The sensor 230 may include at least one sensor from among a thermal sensor, a voltage sensor, a current sensor, a humidity sensor, a mechanical impact sensor, and an acceleration sensor. The sensor 230 may sense a specific impact among various types of impacts. Although the sensor 230 is shown as a single block in FIG. 1, this does not mean that the storage device 20 includes the single sensor 230. That is, according to an embodiment, the storage device 20 may include a plurality of sensors 230, and each of the plurality of sensors 230 may include any one sensor among the thermal sensor, the voltage sensor, the current sensor, the humidity sensor, the mechanical impact sensor, and the acceleration sensor.

The strain gauge 240 may sense a physical strain of the storage device 20. For example, the strain gauge 240 may sense the physical strains of the components inside the storage device 20. The strain gauge 240 may measure the physical strain inside the storage device 20, using a Wheatstone bridge circuit, for example. That is, the strain gauge 240 may sense the physical strain of the storage device 20, using the deformation of the electric resistance of the Wheatstone bridge circuit.

The strain gauge 240 may provide the storage controller 200 with a strain signal including information about the sensed physical strain of the storage device 20. The strain signal provided by the strain gauge 240 to the storage controller 200 may include information about the level of the internal physical strain sensed by the strain gauge 240. That is, the strain gauge 240 may provide the storage controller 200 with a strain signal including information on a physical strain level of the storage device 20. For example, the strain gauge 240 may provide the storage controller 200 with a sensor signal indicating that the physical strain of the storage device 20 corresponds to the first level.

The storage controller 200 may control the operation of the components inside the storage device 20 in response to the sensor signal provided from the sensor 230 and/or the strain signal provided from the strain gauge 240. In some embodiments, the storage controller 200 may control the operation of the buffer memory 220 in response to a sensor signal provided from the sensor 230 and/or a strain signal provided from the strain gauge 240. In some embodiments, the storage controller 200 may control the operation of the non-volatile memory 300 in response to the sensor signal provided from the sensor 230 and/or the strain signal provided from the strain gauge 240. In some embodiments, the storage controller 200 may control the operation of the storage controller 200 in response to the sensor signal provided from the sensor 230 and/or the strain signal provided from the strain gauge 240.

The storage controller 200 may store data about the physical strain of the storage device 20 measured by the strain gauge 240 in response to the strain signal provided from the strain gauge 240. For example, the storage controller 200 may store data about the physical strain of the storage device 20 measured by the strain gauge 240 in the buffer memory 220.

The storage controller 200 may generally control the operation of the storage device 20, depending on the level of the impact of the storage device 20 indicated by the sensor signal and/or the level of the physical strain of the storage device 20 indicated by the strain signal. For example, the storage controller 200 may adjust the operation of the buffer memory 220 of the storage device 20, the non-volatile memory 300, and/or the storage controller 200, depending on the level of impact of the storage device 20 and/or the level of the physical strain of the storage device 20. The operation of the storage device 20 is described in further detail in reference to FIG. 11.

Although the strain gauge 240 is shown as a single block in FIG. 1, it does not mean that the storage device 20 includes the single strain gauge 240. That is, according to an embodiment, the storage device 20 may include a plurality of strain gauges 240.

The number and arrangement of components shown in FIG. 1 are provided as an example of a storage device 20 according to various embodiments. In practice, the storage device 20 may include additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Figure 2:
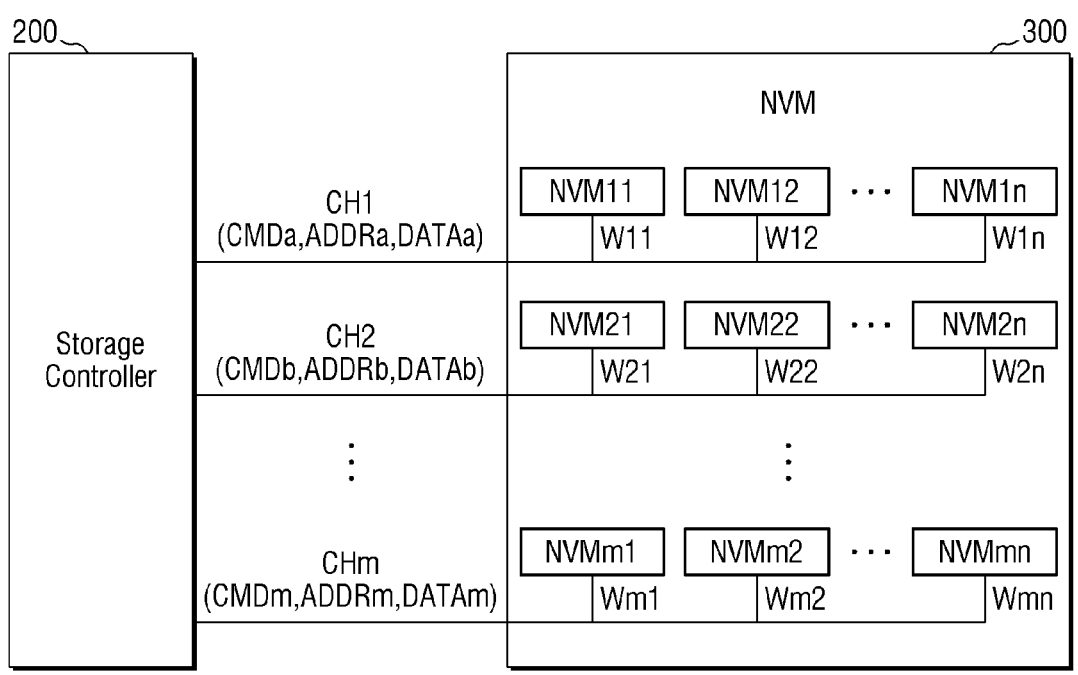
FIG. 2 is a diagram which shows the storage controller and the non-volatile memory of the storage device of FIG. 1 in a reconfigured manner.

FIG. 2 is a diagram which shows the storage controller and the non-volatile memory of the storage device of FIG. 1 in a reconfigured manner.

Referring to FIG. 2, the storage device 20 may include a non-volatile memory 300 and a storage controller 200. The storage device 20 may support a plurality of channels CH1 to CHm, and the non-volatile memory 300 and the storage controller 200 may be connected through the plurality of channels CH1 to CHm, where m is a positive integer greater than zero. For example, the non-volatile memory 300 may be implemented as a storage device such as an SSD.

The non-volatile memory 300 may include a plurality of banks NVM11 to NVMmn, where n is a positive integer greater than zero. Each of the banks NVM11 to NVMmn may be connected to one of a plurality of channels CH1 to CHm through corresponding ways. For example, the plurality of banks NVM11 to NVM1n may be connected to a first channel CH1 through ways W11 to W1n, the plurality of banks NVM21 to NVM2n may be connected to a second channel CH2 through ways W21 to W2n, and the plurality of banks NVMm1 to NVMmn may be connected to an m-th channel CHm through ways Wm1 to Wmn. In an exemplary embodiment, each of the plurality of banks NVM11 to NVMmn may be implemented in any memory unit that may operate in accordance with individual instructions from the storage controller 200. For example, although each of the plurality of banks NVM11 to NVMmn may be implemented as a chip or a die, the present disclosure is not limited thereto.

The storage controller 200 may transmit and receive signals to and/or from the non-volatile memory 300 through the plurality of channels CH1 to CHm. For example, the storage controller 200 may transmit commands CMDa to CMDm, addresses ADDRa to ADDRm, and data DATAa to DATAm to the non-volatile memory 300 through the channels CH1 to CHm, and/or may receive the data DATAa to DATAm from the non-volatile memory 300.

The storage controller 200 may select one of the non-volatile memory devices connected to the channel through each channel, and may transmit and/or receive signals to and/or from the selected non-volatile memory device. For example, the storage controller 200 may select a first bank NVM11 from among the plurality of banks NVM11 to NVM1n connected to the first channel CH1. The storage controller 200 may transmit command CMDa, address ADDRa, and data DATAa to the selected first bank NVM11 through the first channel CH1 and/or may receive the data DATAa from the selected first bank NVM11.

The storage controller 200 may transmit and receive signals in parallel to and/or from the non-volatile memory 300 through channels different from each other. For example, the storage controller 200 may transmit a command CMDb to the non-volatile memory 300 through the second channel CH2, while transmitting the command CMDa to the non-volatile memory 300 through the first channel CH1. For example, the storage controller 200 may receive data DATAb from the non-volatile memory 300 through the second channel CH2, while receiving the data DATAa from the non-volatile memory 300 through the first channel CH1.

The storage controller 200 may control the overall operation of the non-volatile memory 300. The storage controller 200 may transmit the signal to the channels CH1 to CHm to control each of the plurality of banks NVM11 to NVMmn connected to the channels CH1 to CHm. For example, the storage controller 200 may transmit the command CMDa and the address ADDRa to the first channel CH1 to control a selected bank of the plurality of banks NVM11 to NVM1n.

Each of the plurality of banks NVM11 to NVMmn may operate in accordance with the control of the storage controller 200. For example, the first bank NVM11 may program the data DATAa in accordance with the command CMDa, the address ADDRa, and the data DATAa provided to the first channel CH1. For example, another bank NVM21 may read the data DATAb in accordance with the command CMDb and the address ADDRb provided to the second channel CH2, and may transmit the read data DATAb to the storage controller 200.

Although FIG. 2 shows that the non-volatile memory 300 communicates with the storage controller 200 through m channels, and the non-volatile memory 300 includes n non-volatile memory devices to correspond to each channel, the number of channels and the number of non-volatile memory devices connected to one channel may be changed without deviating from the scope of the present disclosure.

Figure 3:
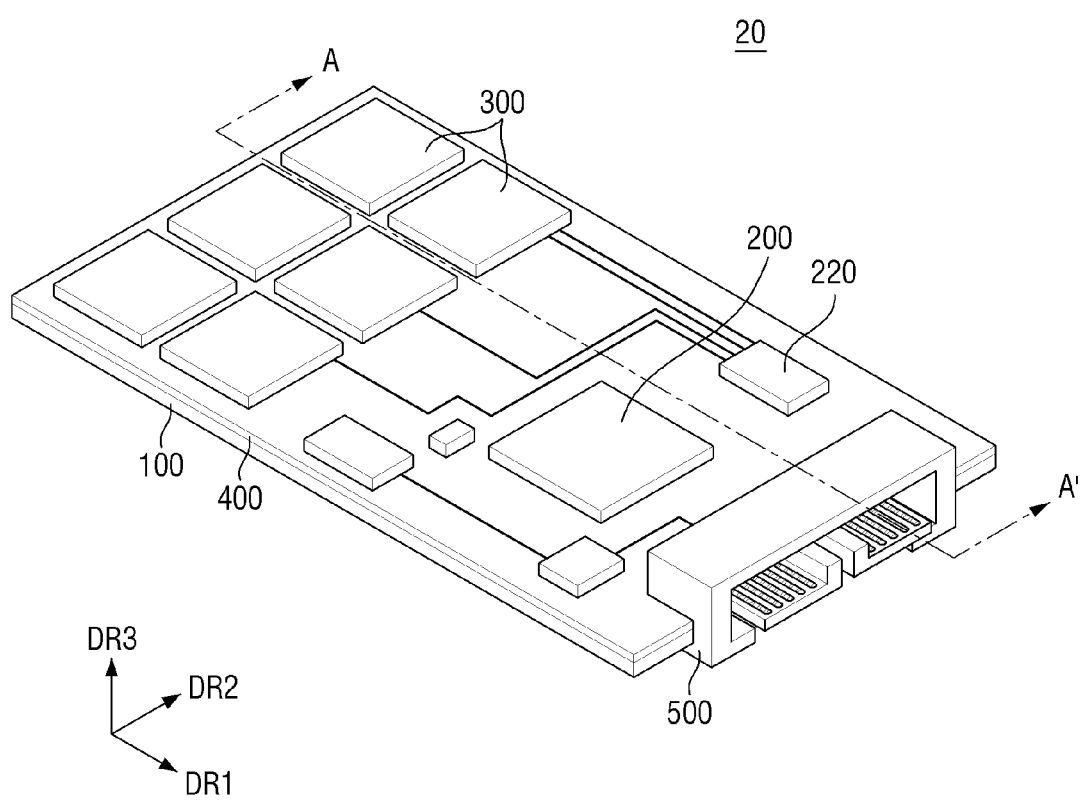
FIG. 3 is a perspective view which shows a storage device according to some embodiments.
Figure 4:
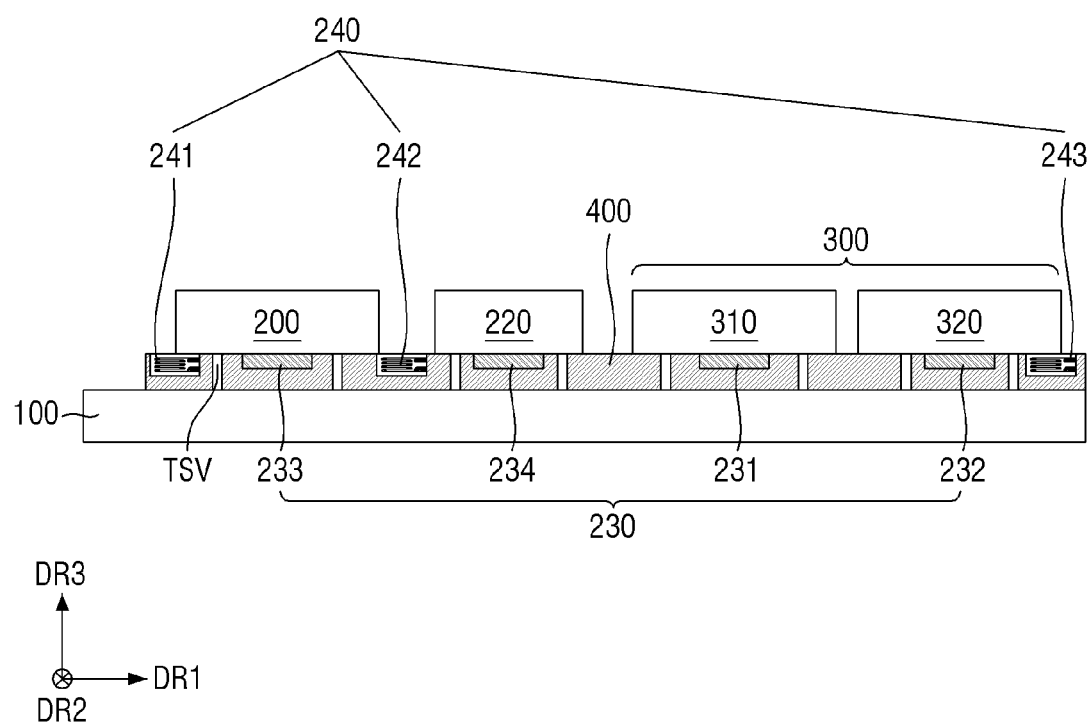
FIGS. 4 to 6 are cross-sectional views for explaining a storage device according to some embodiments.
Figure 5:
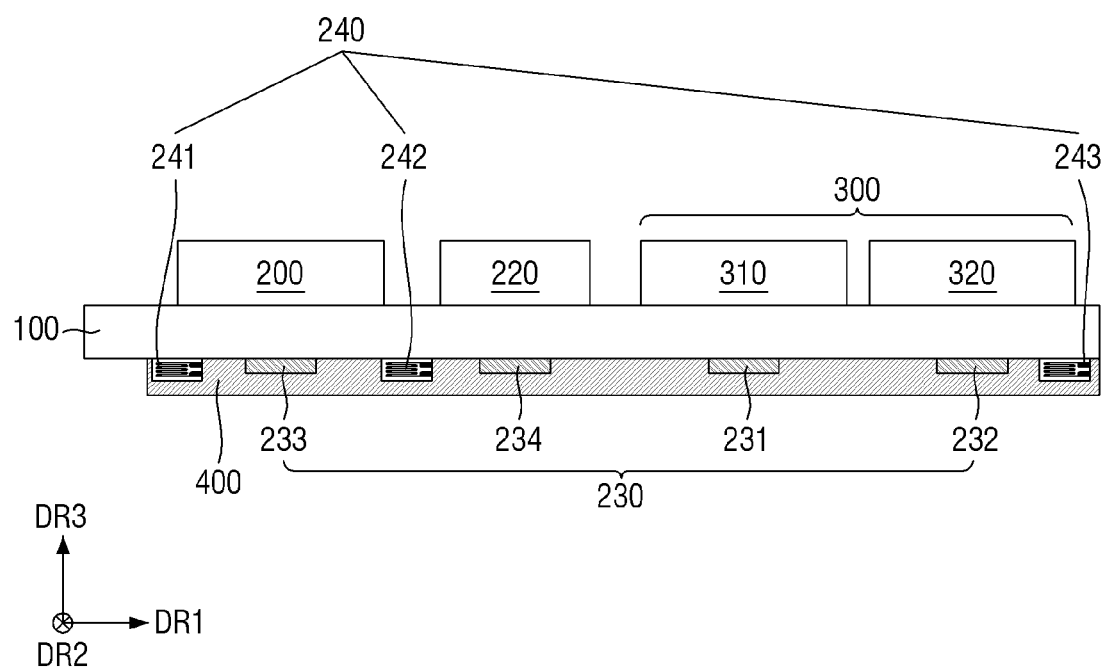
Figure 6:
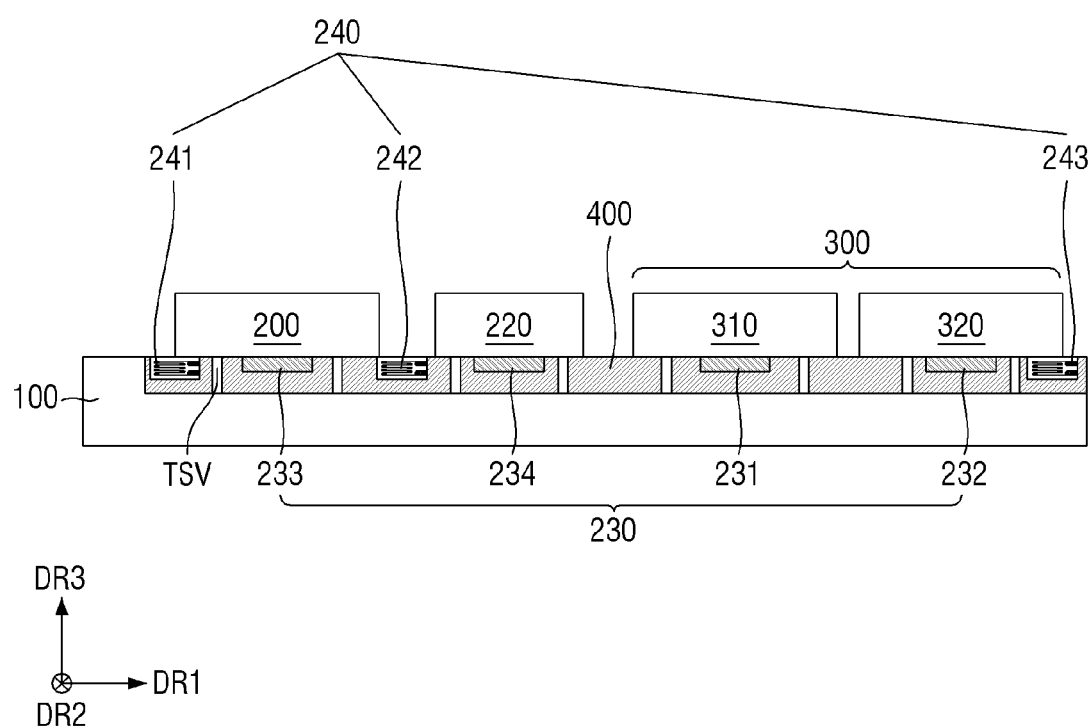
Figure 7:
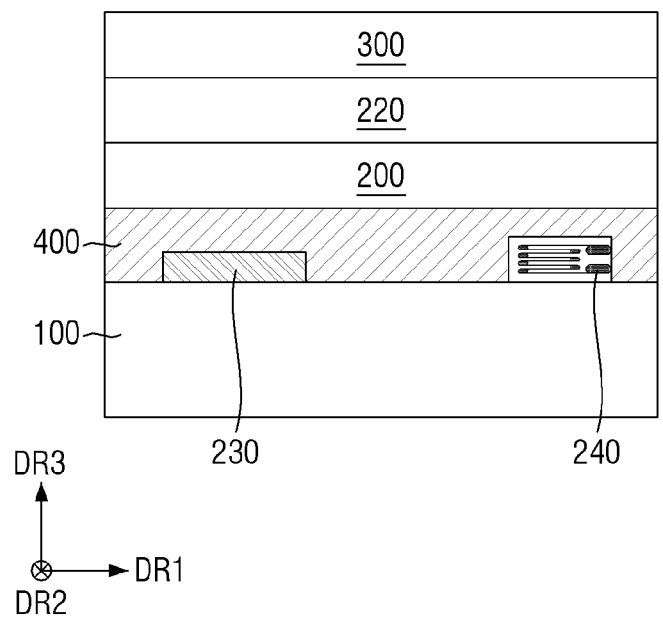
FIGS. 7 and 8 are cross-cross-sectional views for explaining a storage device according to some other embodiments.
Figure 8:
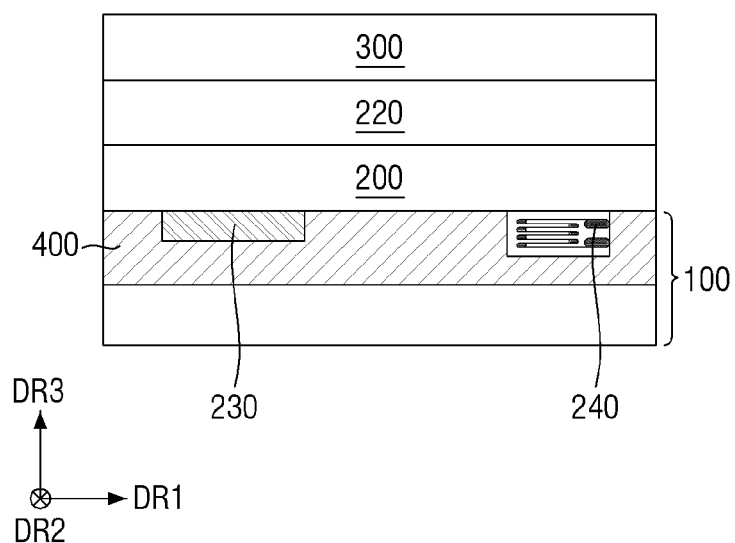
Figure 9:
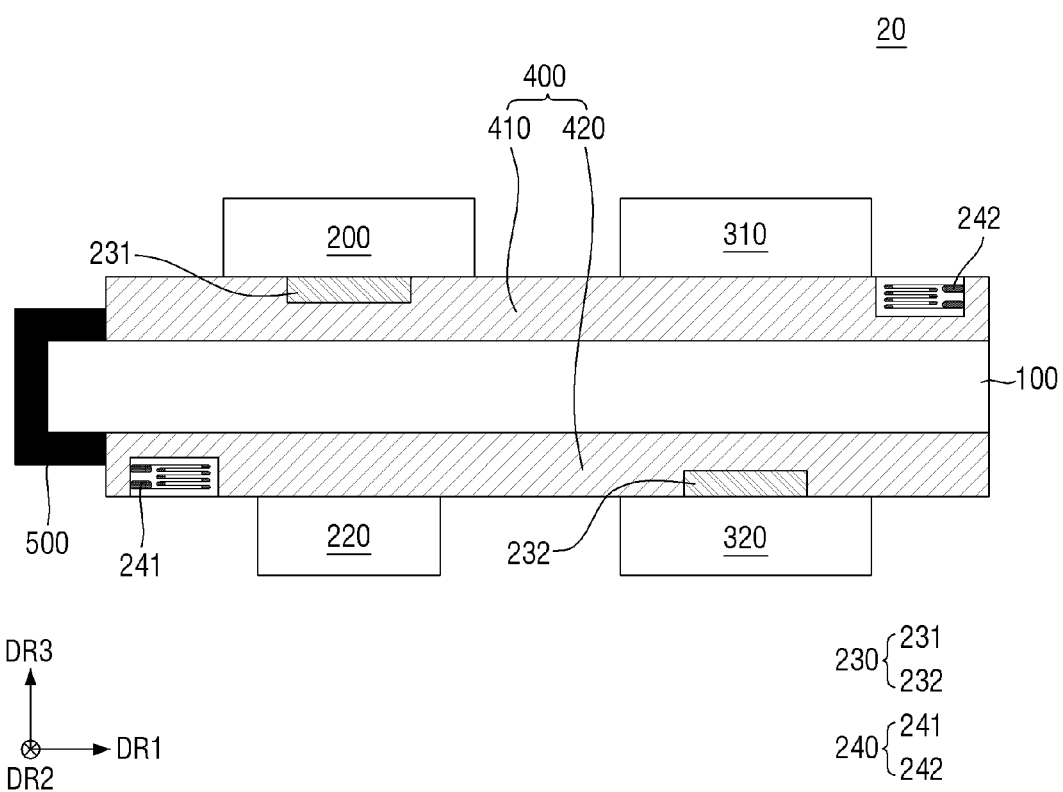
FIGS. 9 and 10 are cross-sectional views for explaining a storage device according to some other embodiments.
Figure 10:
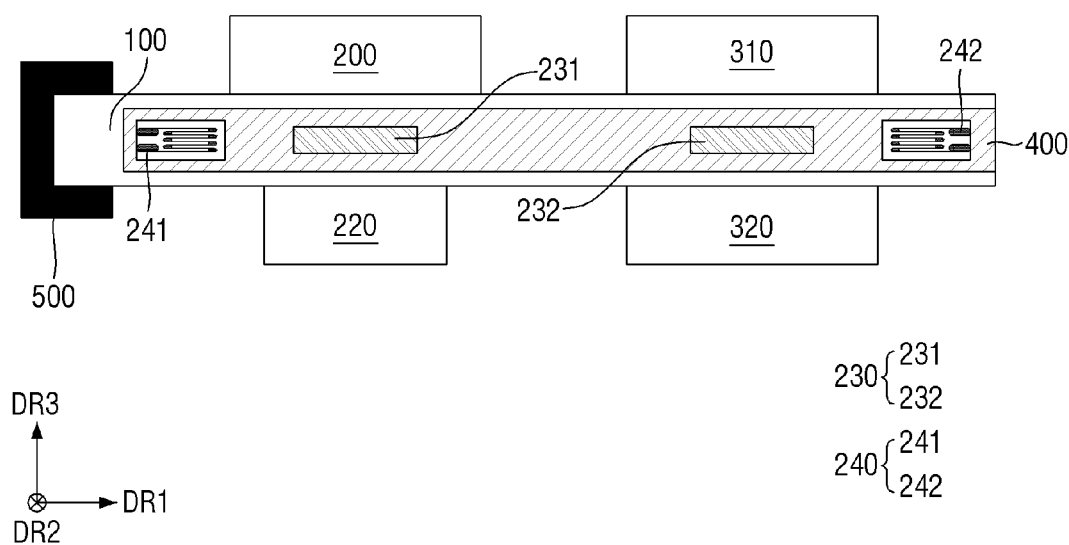

FIG. 3 is a perspective view which shows a storage device according to some embodiments. FIGS. 4 to 6 are cross-sectional views for explaining a storage device according to some embodiments. FIGS. 7 and 8 are cross-cross-sectional views for explaining a storage device according to some other embodiments. FIGS. 9 and 10 are cross-sectional views for explaining a storage device according to some other embodiments. For reference, FIGS. 4 to 10 show storage devices 20 having different standards. For convenience of explanation, repeated explanation will be omitted.

Referring to FIGS. 3 and 4, the storage device 20 may include a package substrate 100, a first semiconductor chip 220, a second semiconductor chip 300, a third semiconductor chip 200, and an active interposer 400. The first semiconductor chip 220 may correspond to the buffer memory 220 of FIG. 1. The second semiconductor chip 300 may correspond to the non-volatile memory 300 of FIG. 1. The third semiconductor chip 200 may correspond to the storage controller 200 of FIG. 1. For convenience of explanation, the terms of the first semiconductor chip 220, the second semiconductor chip 300, and the third semiconductor chip 200 will be described below.

The first semiconductor chip 220, the second semiconductor chip 300, and the third semiconductor chip 200 may be placed on the package substrate 100. The first semiconductor chip 220, the second semiconductor chip 300, and the third semiconductor chip 200 may be placed on the package substrate 100 with an active interposer 400 interposed between them. The first semiconductor chip 220, the second semiconductor chip 300, and the third semiconductor chip 200 may be connected to the package substrate 100 through the active interposer 400. The first semiconductor chip 220, the second semiconductor chip 300, and the third semiconductor chip 200 may all be placed on the upper surface of the package substrate 100.

The second semiconductor chip 300 may include a first non-volatile memory chip 310 and a second non-volatile memory chip 320. The first semiconductor chip 220, the third semiconductor chip 200, the first non-volatile memory chip 310, and the second non-volatile memory chip 320 may be placed on the package substrate 100 to be spaced apart from each other.

The package substrate 100 may be a printed circuit board (PCB). The package substrate 100 may be a rigid printed circuit board (RPCB) and/or a flexible printed circuit board (FPCB). The package substrate 100 may be supplied with electric power from an external power source, may input and output the data to and from an external host to receive an electric signal from the outside, and may provide the electric signal to the storage controller 200.

The package substrate 100 may include a connector 500. The connector 500 may provide an electrical signal provided from the outside to other configurations included in the package substrate 100. The connector 500 may include a plurality of pins that protrudes in a first direction DR1.

The active interposer 400 may be placed on the package substrate 100. That is, the active interposer 400 may vertically overlap the package substrate 100, and the active interposer 400 may be brought into contact with the package substrate 100. The active interposer 400 may be placed between the package substrate 100 and the first semiconductor chip 220, the second semiconductor chip 300, and the third semiconductor chip 200.

The active interposer 400 may include a through-silicon via TSV. The active interposer 400 may connect the first semiconductor chip 220, the second semiconductor chip 300, and the third semiconductor chip 200 to the package substrate 100 through the through-silicon via TSV. That is, the active interposer 400 may electrically connect the first semiconductor chip 220, the second semiconductor chip 300, and the third semiconductor chip 200 to the package substrate 100 through the through-silicon via TSV.

The active interposer 400 may include a logic element inside. For example, the active interposer 400 may include elements such as a DC/DC converter, a power supply module, and a regulator. However, the embodiment is not limited thereto, and the active interposer 400 may include a logic element in a form including another power supply.

The active interposer 400 may include a sensor 230 and a strain gauge 240 mounted inside.

The sensor 230 may include a first sensor 231 to a fourth sensor 234. The first sensor 231 to the fourth sensor 234 may be mounted inside the active interposer 400. The sensor 230 may be mounted inside the active interposer 400 in a chiplet structure. A plurality of sensors 230 having a chiplet structure may be mounted inside the active interposer 400. For example, a plurality of sub-chiplets including the sensor 230 may be placed inside the active interposer 400. The plurality of sub-chiplets may each include a sensor 230 that senses any one of temperature, voltage, current, humidity, mechanical impact, and acceleration. The plurality of sub-chiplets may be placed at different positions inside the active interposer 400. The sensor 230 included in the plurality of sub-chiplets placed at different positions may sense the impact generated at each position.

The first sensor 231 to the fourth sensor 234 may be placed close to the first non-volatile memory chip 310, the second non-volatile memory chip 320, the first semiconductor chip 220, and the third semiconductor chip 200. For example, in an embodiment, the first sensor 231 may be placed closest to the first non-volatile memory chip 310, the second sensor 232 may be placed closest to the second non-volatile memory chip 320, the third sensor 233 may be placed closest to the third semiconductor chip 200, and the fourth sensor 234 may be placed closest to the first semiconductor chip 220.

For example, the first sensor 231 to the fourth sensor 234 may be placed to at least partially vertically overlap the first non-volatile memory chip 310, the second non-volatile memory chip 320, the third semiconductor chip 200, and the first semiconductor chip 220, respectively. The first sensor 231 may be placed to at least partially vertically overlap the first non-volatile memory chip 310. The second sensor 232 may be placed to at least partially vertically overlap the second non-volatile memory chip 320. The third sensor 233 may be placed to at least partially vertically overlap the third semiconductor chip 200. The fourth sensor 234 may be placed to at least partially vertically overlap the first semiconductor chip 220. However, the embodiment is not limited thereto, and the first sensor 231 to the fourth sensor 234 may be placed so as not to overlap the first non-volatile memory chip 310, the second non-volatile memory chip 320, the third semiconductor chip 200, and the first semiconductor chip 220.

In some embodiments, the first sensor 231 to the fourth sensor 234 may sense different types of impacts from each other. For example, the first sensor 231 may sense heat of the storage device 20, the second sensor 232 may sense the voltage and/or the current of the storage device 20, the third sensor 233 may sense the humidity of the storage device 20, and the fourth sensor 234 may sense the mechanical impact of the storage device 20.

In other embodiments, the first sensor 231 to the fourth sensor 234 may all sense the same type of impact. For example, the first sensor 231 to the fourth sensor 234 may each sense the heat and/or temperature of the storage device 20.

The first sensor 231 to the fourth sensor 234 may each provide information on the sensed impact to the third semiconductor chip 200 as a sensor signal. That is, the first sensor 231 to the fourth sensor 234 may provide the third semiconductor chip 200 with information about the level of the impact sensed at the respective placed positions through the sensor signal.

The third semiconductor chip 200 may control the operation of the internal element of the storage device 20 in response to the sensor signals provided from the first sensor 231 to the fourth sensor 234. That is, the third semiconductor chip 200 may control the operations of the first non-volatile memory chip 310, the second non-volatile memory chip 320, the first semiconductor chip 220 and the third semiconductor chip 200, in response to the sensor signals provided from the first sensor 231 to the fourth sensor 234.

In some embodiments, the third semiconductor chip 200 may control the operation of the first non-volatile memory chip 310 in response to the sensor signal provided from the first sensor 231. For example, the third semiconductor chip 200 may switch the mode of operation of the first non-volatile memory chip 310 in response to the sensor signal provided from the first sensor 231. That is, the third semiconductor chip 200 may determine that the sensor signal provided from the first sensor 231 provides information on the impact generated due to the operation of the first non-volatile memory chip 310 placed closest to the first sensor 231.

The third semiconductor chip 200 may control the operation of the second non-volatile memory chip 320 in response to the sensor signal provided from the second sensor 232. For example, the third semiconductor chip 200 may switch the mode of operation of the second non-volatile memory chip 320 in response to the sensor signal provided from the second sensor 232. That is, the third semiconductor chip 200 may determine that the sensor signal provided from the second sensor 232 provides information on the impact generated due to the operation of the second non-volatile memory chip 320 placed closest to the second sensor 232.

The third semiconductor chip 200 may control the operation of the third semiconductor chip 200 in response to the sensor signal provided from the third sensor 233. For example, the third semiconductor chip 200 may change the speed of operation of the third semiconductor chip 200 in response to the sensor signal provided from the third sensor 233. That is, the storage controller 200 corresponding to the third semiconductor chip 200 may determine that the sensor signal provided from the third sensor 233 provides information about the impact generated due to the operation of the storage controller 200 placed closest to the third sensor 233.

Similarly, the third semiconductor chip 200 may control the operation of the first semiconductor chip 220 in response to the sensor signal provided from the fourth sensor 234. For example, the third semiconductor chip 200 may switch the mode of operation of the first semiconductor chip 220 in response to the sensor signal provided from the fourth sensor 234. That is, the storage controller 200 corresponding to the third semiconductor chip 200 may determine that the sensor signal provided from the fourth sensor 234 provides information about the impact generated due to the operation of the buffer memory 220 which corresponds to the first semiconductor chip 220 placed closest to the fourth sensor 234.

The strain gauge 240 may include a first strain gauge 241 to a third strain gauge 243. The first strain gauge 241 to the third strain gauge 243 may be mounted inside the active interposer 400. The first strain gauge 241 may be placed at one end of the active interposer 400. The third strain gauge 243 may be placed at the other end of the active interposer 400. That is, the first strain gauge 241 and the third strain gauge 243 may each be placed at the edge portion of the active interposer 400. The second strain gauge 242 may be placed adjacent to the third semiconductor chip 200. For example, the second strain gauge 242 may be placed between the third semiconductor chip 200 and the first semiconductor chip 220.

The first strain gauge 241 to the third strain gauge 243 may each provide information on the sensed physical strain of the storage device 20 to the third semiconductor chip 200 as a strain signal. For example, the first strain gauge 241 to the third strain gauge 243 may provide information on the level of the physical strain sensed at each placed position to the third semiconductor chip 200 through the strain signal.

The third semiconductor chip 200 may control the operation of the internal element of the storage device 20 in response to the strain signals provided from the first strain gauge 241 to the third strain gauge 243. That is, the third semiconductor chip 200 may control the operations of the first non-volatile memory chip 310, the second non-volatile memory chip 320, the third semiconductor chip 200 and the first semiconductor chip 220, in response to the strain signals provided from the first strain gauge 241 to the third strain gauge 243.

In some embodiments, the third semiconductor chip 200 may switch the operating modes of the first non-volatile memory chip 310, the second non-volatile memory chip 320 and the first semiconductor chip 220, in response to the strain signals provided from the first strain gauge 241 to the third strain gauge 243. Alternatively or additionally, the third semiconductor chip 200 may change the operating speed of the third semiconductor chip 200 in response to the strain signals provided from the first strain gauge 241 to the third strain gauge 243.

Although the sensor 230 is shown to include four first sensors 231 to fourth sensors 234 and three first strain gauges 241 to third strain gauges 243 in FIG. 4, the embodiment is not limited thereto. According to the embodiment, the number of sensors 230 and the number of strain gauges 240 may be varied without deviating from the scope of the present disclosure.

Referring to FIG. 5, the active interposer 400 may be placed on a lower surface of the package substrate 100. That is, the active interposer 400 may vertically overlap the package substrate 100, and the active interposer 400 may be brought into contact with the package substrate 100. In some embodiments, the active interposer 400 may not come into contact with the first semiconductor chip 220, the second semiconductor chip 300, and the third semiconductor chip 200. That is, the first semiconductor chip 220, the second semiconductor chip 300, and the third semiconductor chip 200 may be placed on the active interposer 400 with the package substrate 100 interposed between them. Even in this case, the sensor 230 and the strain gauge 240 may be placed inside the active interposer 400.

Referring to FIG. 6, the package substrate 100 may include an active interposer 400. That is, the active interposer 400 may be mounted inside the package substrate 100. Even in this case, the sensor 230 and the strain gauge 240 may be placed inside the active interposer 400. In some embodiments, the sensor 230 and the strain gauge 240 may be placed inside the active interposer 400, and may be simultaneously mounted inside the package substrate 100.

Although FIGS. 4 to 6 show that the first sensor 231 to the fourth sensor 234 all overlap the first semiconductor chip 220, the second semiconductor chip 300, and the third semiconductor chip 200, the embodiment is not limited thereto. For example, the first sensor 231 to the fourth sensor 234 may be placed between the first semiconductor chip 220, the second semiconductor chip 300, and the third semiconductor chip 200, respectively. The first sensor 231 to the fourth sensor 234 may be mounted inside the active interposer 400 so as not to overlap the first semiconductor chip 220, the second semiconductor chip 300, and the third semiconductor chip 200.

Referring to FIG. 7, the first semiconductor chip 220, the second semiconductor chip 300, and the third semiconductor chip 200 may be placed on the package substrate 100. The first semiconductor chip 220, the second semiconductor chip 300, and the third semiconductor chip 200 may be placed on the package substrate 100 with the active interposer 400 interposed between them. The active interposer 400 may be placed on the package substrate 100.

The first semiconductor chip 220, the second semiconductor chip 300, and the third semiconductor chip 200 may be stacked on the active interposer 400. That is, the first semiconductor chip 220, the second semiconductor chip 300, and the third semiconductor chip 200 may be stacked to vertically overlap the package substrate 100 and the active interposer 400. The first semiconductor chip 220, the second semiconductor chip 300, and the third semiconductor chip 200 may be connected to the active interposer 400 and the package substrate 100 through a ball grid array (BLG) manner.

The sensor 230 and the strain gauge 240 may be placed inside the active interposer 400. The sensor 230 and the strain gauge 240 may be placed to be closer to the package substrate 100 than the first semiconductor chip 220, the second semiconductor chip 300 and the third semiconductor chip 200 inside the active interposer 400. That is, the sensor 230 and the strain gauge 240 may be placed on the lower surface of the active interposer 400. The sensor 230 and the strain gauge 240 may come into contact with the package substrate 100. However, the embodiment is not limited thereto. The position where the sensor 230 and the strain gauge 240 are placed inside the active interposer 400 may be changed according to the embodiment.

Referring to FIG. 8, the active interposer 400 may be mounted inside the package substrate 100, and the first semiconductor chip 220, the second semiconductor chip 300, and the third semiconductor chip 200 may be stacked on the active interposer 400. That is, the package substrate 100 includes the active interposer 400, and the first semiconductor chip 220, the second semiconductor chip 300, and the third semiconductor chip 200 may be placed on the package substrate 100.

Although FIGS. 7 and 8 show that the third semiconductor chip 200, the first semiconductor chip 220, and the second semiconductor chip 300 are sequentially stacked on the package substrate 100 and the active interposer 400, the embodiment is not limited thereto. For example, the first semiconductor chip 220, the third semiconductor chip 200, and the second semiconductor chip 300 may be sequentially stacked on the package substrate 100 and the active interposer 400.

Also, although FIGS. 7 and 8 show that the first semiconductor chip 220, the second semiconductor chip 300, and the third semiconductor chip 200 have the same width in the first direction DR1, the embodiment is not limited thereto. The widths of the first semiconductor chip 220, the second semiconductor chip 300, and the third semiconductor chip 200 may be different from each other in the first direction DR1.

Referring to FIG. 9, the storage device 20 may include a first active interposer 410 and a second active interposer 420. The first active interposer 410 may be placed on the first surface of the package substrate 100. The second active interposer 420 may be placed on the second surface of the package substrate 100. The first surface and the second surface may face each other. That is, the first active interposer 410 and the second active interposer 420 may be spaced apart from each other in the third direction DR3 with the package substrate 100 interposed between them. The first active interposer 410 and the second active interposer 420 may each be connected to the package substrate 100. The first active interposer 410 and the second active interposer 420 may each come into contact with the package substrate 100.

The third semiconductor chip 200 and the first non-volatile memory chip 310 may be placed on the first active interposer 410. The first semiconductor chip 220 and the second non-volatile memory chip 320 may be placed on the second active interposer 420. The third semiconductor chip 200 and the first non-volatile memory chip 310 may face each other, and the first semiconductor chip 220 and the second non-volatile memory chip 320 may face each other, with the package substrate 100, the first active interposer 410 and the second active interposer 420 interposed between them. The third semiconductor chip 200 and the first non-volatile memory chip 310 may be spaced apart from each other, and the first semiconductor chip 220 and the second non-volatile memory chip 320 may be spaced apart from each other in the third direction DR3, with the package substrate 100, the first active interposer 410 and the second active interposer 420 interposed between them.

The first sensor 231 and the first strain gauge 241 may be placed inside the first active interposer 410. The second sensor 232 and the second strain gauge 242 may be placed inside the second active interposer 420. The first sensor 231 and the second sensor 232 may be placed so as not to overlap each other in the third direction DR3. For example, the first sensor 231 may be placed to overlap the third semiconductor chip 200 and the first semiconductor chip 220, and the second sensor 232 may be placed to overlap the first non-volatile memory chip 310 and the second non-volatile memory chip 320.

The first strain gauge 241 and the second strain gauge 242 may be placed so as not to overlap each other. For example, the first strain gauge 241 may be placed at one end of the first active interposer 410, and the second strain gauge 242 may be placed at the other end of the second active interposer 420. That is, the first strain gauge 241 and the second strain gauge 242 may each be placed at edge portions of different directions inside the first active interposer 410 and the second active interposer 420.

Referring to FIG. 10, the package substrate 100 may include an active interposer 400. That is, the active interposer 400 may be mounted inside the package substrate 100.

The first sensor 231, the second sensor 232, the first strain gauge 241 and the second strain gauge 242 may all be mounted inside the single active interposer 400. The first strain gauge 241 and the second strain gauge 242 may be placed at the edge portion of the active interposer 400. The first strain gauge 241 and the second strain gauge 242 may be placed at one end and the other end of the active interposer 400, respectively.

Although FIGS. 9 and 10 show that the third semiconductor chip 200 and the first non-volatile memory chip 310 are placed on the upper surface of the package substrate 100, and the first semiconductor chip 220 and the second non-volatile memory chip 320 are placed on the lower surface of the package substrate 100, the embodiments are not limited thereto. The third semiconductor chip 200 and the first semiconductor chip 220 may be placed on the upper surface of the package substrate 100, and the first non-volatile memory chip 310 and the second non-volatile memory chip 320 may be placed on the lower surface of the package substrate 100.

FIG. 11 is a diagram for explaining the operation of the storage device according to some embodiments.

Referring to FIGS. 1 and 11, the storage controller 200 may switch the mode of the storage device 20, depending on the level of the impact on the storage device 20 or the physical strain of the storage device 20.

In some embodiments, if the sensor 230 indicates that the impact of the storage device 20 is at a first level through the sensor signal, the storage controller 200 may notify the host device 10 that the impact of the first level is sensed. Alternatively or additionally, if the strain gauge 240 indicates that the physical strain of the storage device 20 is at the first level through the change signal, the storage controller 200 may inform the host device 10 that the physical strain of the first level is sensed.

If the impact sensed by the sensor 230 is at the first level, and/or if the physical strain sensed by the strain gauge 240 is at the first level, the storage controller 200 may not switch the operating mode of the storage device 20. For example, if the impact sensed by the sensor 230 is at the first level, or if the physical strain sensed by the strain gauge 240 is at the first level, the storage controller 200 may not change the operating mode of the buffer memory 220 and the non-volatile memory 300.

In some embodiments, if the sensor 230 indicates that the impact of the storage device 20 is at a second level through the sensor signal, the storage controller 200 informs the host device 10 that the impact of the second level is sensed, and may adjust the operating speed of the storage device 20. For example, if the sensor 230 senses impact of the second level, the storage controller 200 may adjust the operating speeds of the buffer memory 220 and the non-volatile memory 300 controlled by the storage controller 200. For example, if the sensor 230 including the thermal sensor senses that the heat or temperature of the storage device 20 is at the second level, the storage controller 200 may perform a dynamic thermal throttling (DTT) operation that reduces the throughput.

Alternatively or additionally, if the strain gauge 240 indicates that the physical strain of the storage device 20 is at the second level through the change signal, the storage controller 200 informs the host device 10 that the physical strain of the second level is sensed, and may adjust the operating speed of the storage device 20. For example, if the strain gauge 240 senses the physical strain of the second level, the storage controller 200 may adjust the operating speeds of the buffer memory 220 and the non-volatile memory 300 controlled by the storage controller 200. For example, the storage controller 200 may reduce the operating speed of the storage device 20 so that the physical strain does not increase.

In some embodiments, if the sensor 230 indicates that the impact of the storage device 20 is at a third level through the sensor signal, the storage controller 200 may perform the host device 10 that the impact of the third level is sensed, and may switch the operating mode of the storage device 20. Alternatively or additionally, if the strain gauge 240 indicates that the physical strain of the storage device 20 is at the third level through the change signal, the storage controller 200 may inform the host device 10 that the physical strain of the third level is sensed, and may switch the operating mode of the storage device 20.

For example, if the sensor 230 senses impact of the third level, or if the strain gauge 240 senses physical strain of the third level, the storage controller 200 may block the data from being written on the non-volatile memory 300, and may switch to a read-only mode in which only read is possible.

In some embodiments, if the sensor 230 indicates that the impact of the storage device 20 is at a fourth level through the sensor signal, the storage controller 200 may shut off the power of the storage device 20 by itself. Alternatively or additionally, if the strain gauge 240 indicates that the physical strain of the storage device 20 is at the fourth level through the change signal, the storage controller 200 may shut off the power of the storage device 20 by itself. For example, if the impact or physical strain of the storage device 20 is at the fourth level, the storage controller 200 may shut off the power of the buffer memory 220 and the non-volatile memory 300.

Although FIG. 11 shows that the levels of the impact or the physical strain are divided into four levels from a first level to a fourth level, the embodiment is not limited thereto. For example, the levels of impact or physical strain may be divided into more or less levels (e.g., three levels).

Figure 12:
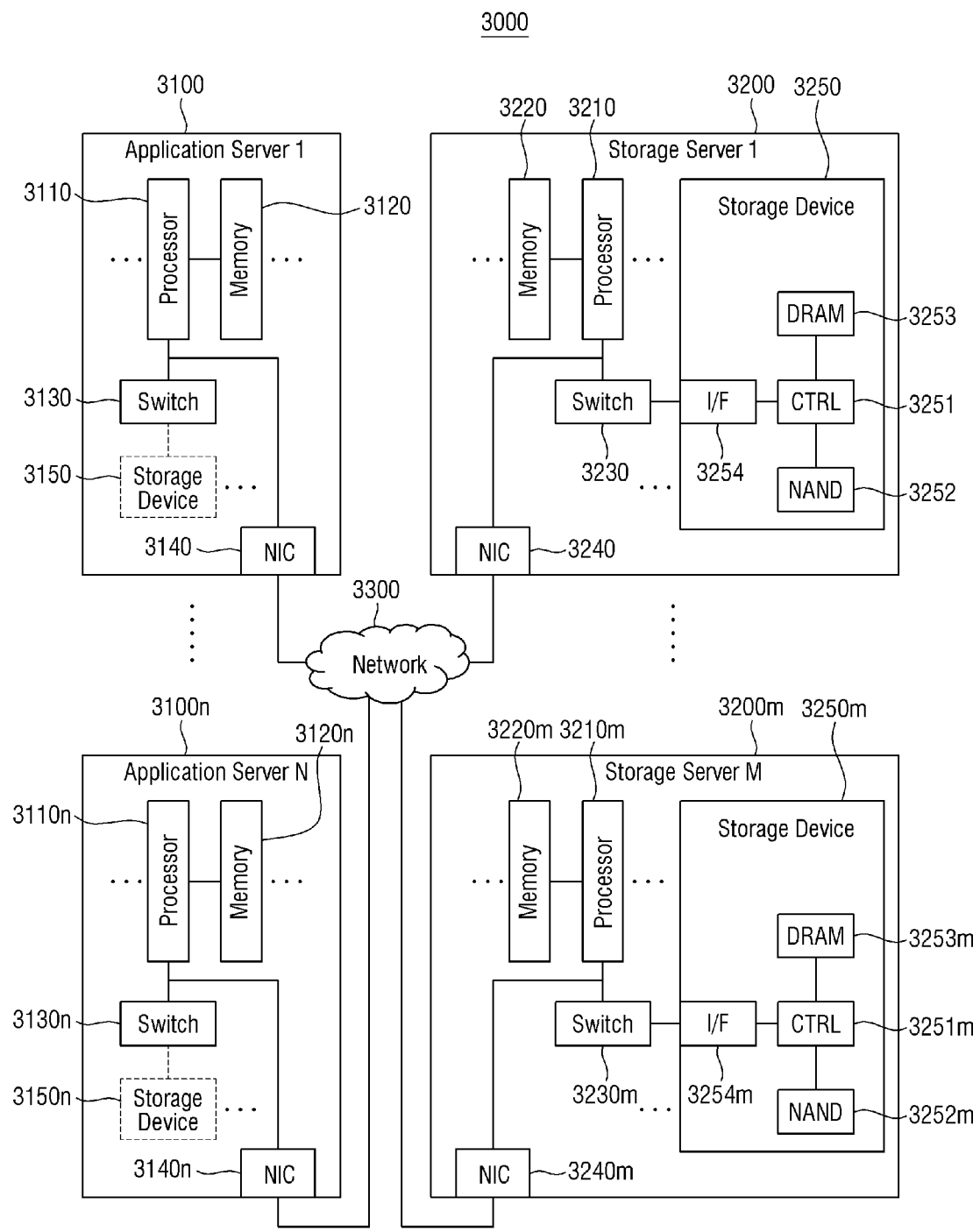
FIG. 12 is a diagram which shows a data center to which the storage device according to some embodiments is applied.

FIG. 12 is a diagram which shows a data center to which the storage device according to some embodiments is applied.

Referring to FIG. 12, a data center 3000 is a facility that maintains and manages various data and provides various services for various data, and may also be called a data storage center. The data center 3000 may be a system for search engine and database operation, and may be a computing system used in various institutions. The data center 3000 may include a plurality of application servers 3100 to 3100n and a plurality of storage servers 3200 to 3200m. The number of the plurality of application servers 3100 to 3100n and the number of the plurality of storage servers 3200 to 3200m may be variously changed.

Hereinafter, for convenience of explanation, an example of the first storage server 3200 is described. Each of the remaining storage server 32002 to 3200m and the plurality of application servers 3100 to 3100n may have a structure similar to that the first storage server 3200.

The first storage server 3200 may include a processor 3210, a memory 3220, a switch 3230, a network interface connector (NIC) 3240, and a storage device 3250. The processor 3210 may control the overall operation of the first storage server 3200. The memory 3220 may store various instructions or data under the control of the processor 3210. The processor 3210 may be configured to access the memory 3220 and execute various instructions or process the data. In an embodiment, the memory 3220 may include at least one of various types of memory devices, such as a double data rate (DDR) synchronous dynamic random-access memory (SDRAM), a high bandwidth memory (HBM), a hybrid memory cube (HMC), a dual in-line memory module (DIMM), an Optane DIMM or a non-volatile DIMM (NVDIMM).

In an embodiment, the number of processors 3210 and the number of memories 3220 included in the first storage server 3200 may be varied. In an embodiment, the processor 3210 and the memory 3220 included in the first storage server 3200 may configure a processor-memory pair, and the number of processor-memory pairs included in the first storage server 3200 may be varied. In an embodiment, the number of processors 3210 and the number of memories 3220 included in the first storage server 3200 may be different from each other. The processor 3210 may include a single-core processor or a multi-core processor.

The switch 3230 may selectively connect the processor 3210 and the storage device 3250 or may selectively connect the NIC 3240 and the storage device 3250 depending on the control of the processor 3210.

The NIC 3240 may be configured to connect the first storage server 3200 to the network 3300. The NIC 3240 may include a network interface card, a network adapter, and the like. The NIC 3240 may be connected to the network 3300 by a wired interface, a wireless interface, a Bluetooth interface, an optical interface, or the like. The NIC 3240 may include an internal memory, a DSP, a host bus interface, and the like, and may be connected to a processor 3210, a switch 2230_1, or the like through the host bus interface. The host bus interface may include at least one of various interfaces such as an Advanced Technology Attachment (ATA), a serial ATA (SATA), an external SATA (e-SATA), a Small Computer Small Interface (SCSI), a Serial Attached SCSI (SAS), a Peripheral Component Interconnection (PCI)), a PCI express (PCIe), a NVMe, an Institute of Electrical and Electronics Engineers (IEEE) 1394, a universal serial bus (USB), a secure digital (SD) card, a multi-media card (MMC), an eMMC, a UFS, an embedded UFS (eUFS), and a compact flash (CF) card interface. In an embodiment, the NIC 3240 may be integrated with at least one of the processor 3210, the switch 2230_1, and the storage device 3250.

The storage device 3250 may store data or output the stored data according to the control of the processor 3210. The storage device 3250 may include a controller 3251, a non-volatile memory 3252, a DRAM 3253, and an interface 3254. In an embodiment, the storage device 3250 may further include Secure Element (SE) for security or privacy. The storage device 3250 may correspond to the storage device 20 described referring to FIGS. 1 to 11, and the controller 3251 may correspond to the storage controller 200 described referring to FIGS. 1 to 11. That is, the storage device 3250 includes the sensor 230 and the strain gauge 240, and the controller 3251 may control the operation of the storage device 3250 to correspond to the situation of the storage device 20 sensed by the sensor 230 and the strain gauge 240.

The controller 3251 may control the general operation of the storage device 3250. In an embodiment, the controller 3251 may include an SRAM. The controller 3251 may store data in the non-volatile memory 3252 in response to the signals received through the interface 3254, or may output the data stored in the non-volatile memory 3252. In an embodiment, the controller 3251 may be configured to control the non-volatile memory 3252 on the basis of a toggle interface or an ONFi interface.

The DRAM 3253 may be configured to temporarily store data to be stored in the non-volatile memory 3252 or data read from the non-volatile memory 3252. The DRAM 3253 may be configured to store various data (e.g., metadata, mapping data, etc.) required for the controller 3251 to operate. The interface 3254 may provide a physical connection between the processor 3210, the switch 3230, or the NIC 3240 and the controller 3251. In an embodiment, the interface 3254 may be implemented in a Direct Attached Storage (DAS) manner in which the storage device 3250 is directly (or indirectly) connected by a dedicated cable.

The configurations of the first storage server 3200 described above are exemplary, and the scope of the present disclosure is not limited thereto. The configurations of the first storage server 3200 described above may be applied to each of the other storage servers or the plurality of application servers. In an embodiment, the storage device 3200 may be arbitrarily omitted in each of the plurality of application servers 3100 to 3100*n*.

The plurality of application servers 3100 to 3100*n* and the plurality of storage servers 3200 to 3200*m* may communicate with each other through a network 3300. The network 3300 may be implemented, using a Fibre Channel (FC), an Ethernet, or the like. For example, the FC may refer to a medium used for a relatively high-speed data transmission, and may use an optical switch that provides high performance/high availability. The storage servers 3200 to 3200*m* may be provided as a file storage, a block storage or an object storage, depending on the access type of the network 3300.

In an embodiment, the network 1300 may be a storage-only network such as a Storage Area Network (SAN). For example, the SAN may be an FC-SAN which uses an FC network and is implemented according to an FC Protocol (FCP). Alternatively or additionally, the SAN may be an IP-SAN which uses a TCP/IP network and is implemented according to an internet SCSI (iSCSI) (e.g., SCSI over TCP/IP or Internet SCSI) protocol. In an embodiment, the network 1300 may be a general network such as a TCP/IP network. For example, the network 1300 may be implemented, according to protocols such as an FC over Ethernet (FCoE), a Network Attached Storage (NAS), and an NVMe over Fabrics (NVMe-oF).

In an embodiment, at least one of the plurality of application servers 3100 to 3100*n* may be configured to access at least the other one of the plurality of application servers 3100 to 3100*n* or at least one of the plurality of storage servers 3200 to 3200*m* through the network 3300.

For example, the first application server 3100 may store the data requested by the user or the client in at least one of a plurality of storage servers 320 to 3200*m* through the network 3300. Alternatively or additionally, the first application server 3100 may acquire the data requested by the user or the client from at least one of a plurality of storage servers 320 to 3200*m* through the network 3300. In this case, the first application server 3100 may be implemented by a Web server, a Database Management System (DBMS), or the like.

That is, the processor 3110 of the first application server 3100 may access the memory 3120*n* or the storage device 3250*m* of another application server (e.g., 2100_*n*) through the network 3300. Alternatively or additionally, the processor 3110 of the first application server 3100 may access the memory 3220 or the storage device 3250 of the first storage server 3200 through the network 3300. Therefore, the first application server 3100 may perform various operations on the data stored in other application servers 31002 to 3100*n* or the plurality of storage servers 3200 to 3200*m*. For example, the first application server 3100 may execute or issue a command for moving or copying the data between other application servers 31002 to 3100*n* or the plurality of storage servers 3200 to 3200*m*. In this case, the data to be moved or copied may pass through the memories 3220 to 3220*m* of the storage servers 320 to 3200*m* from the storage devices 3250 to 3250*m* of the storage servers 3200 to 3200*m*, or may move directly to the memories 3120 to 3120*n* of the application servers 3100 to 3100*n*. The data transferred through the network 3300 may be data encrypted for security or privacy.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A storage device, comprising:
a printed circuit board;
a memory device coupled to the printed circuit board;
a storage controller which controls the memory device and is coupled to the printed circuit board;
an active interposer including a logic element coupled to the printed circuit board;
a sensor disposed inside the active interposer, configured to sense an impact, and provide a sensor signal of the impact to the storage controller; and
a strain gauge disposed inside the active interposer, configured to measure a physical strain and provide a signal about the physical strain to the storage controller,
wherein the storage controller is further configured to switch a mode of the memory device between a plurality of operating modes, based on the sensor signal and the signal about the physical strain.

2. The storage device of claim 1, wherein the sensor is mounted inside the active interposer in a chiplet structure.

3. The storage device of claim 1,
wherein the strain gauge is configured to measure the physical strain based on a deformation of an electric resistance of the strain gauge.

4. The storage device of claim 1, wherein the sensor is further configured to provide the sensor signal to the storage controller, based on a level of the sensed impact being equal to or higher than a threshold value.

5. The storage device of claim 1, wherein the sensor includes at least one of a thermal sensor, a voltage sensor, a current sensor, a humidity sensor, a mechanical impact sensor, and an acceleration sensor.

6. The storage device of claim 1, wherein the active interposer includes a through-silicon via that couples the printed circuit board, the memory device, and the storage controller.

7. The storage device of claim 1, wherein the storage controller is configured to provide a first signal notifying the impact to a host and do not switch the mode of the memory device, in response to a level of impact indicated by the sensor signal provided from the sensor being a first level, and
wherein the storage controller is further configured to provide a second signal notifying the impact to the host and switch the mode of the memory device, in response to the level of impact indicated by the sensor signal provided from the sensor being a second level different from the first level.

8. The storage device of claim 7, wherein the second level includes a third level and a fourth level,
wherein the storage controller is further configured to adjust an operating speed of the memory device, in response to the level of impact indicated by the sensor signal provided from the sensor being the third level, and
wherein the storage controller is further configured to control the memory device to operate in a read-only mode, in response to the level of impact indicated by the sensor signal provided from the sensor being the fourth level.

9. The storage device of claim 8, wherein the second level further includes a fifth level, and
wherein the storage controller is further configured to shut off power of the memory device, in response to the level of impact indicated by the sensor signal provided from the sensor being the fifth level.

10. The storage device of claim 1, wherein the active interposer is disposed on the printed circuit board.

11. The storage device of claim 1, wherein the active interposer is mounted inside the printed circuit board.

12. A storage device, comprising:
a printed circuit board;
a first memory device;
a second memory device;
a storage controller configured to control the first memory device and the second memory device;
an active interposer which couples the storage controller, the first memory device, the second memory device, and the printed circuit board;
a first sensor which is closer to the first memory device than the second memory device, and mounted inside the active interposer;
a second sensor which is closer to the second memory device than the first memory device, and mounted inside the active interposer; and
a strain gauge which is placed inside the active interposer and configured to measure a physical strain and to provide the storage controller with a strain signal of the physical strain,
wherein the first sensor and the second sensor include at least one of a thermal sensor, a voltage sensor, a current sensor, a humidity sensor, a mechanical impact sensor, and an acceleration sensor,
wherein the storage controller is further configured to control an operation of the first memory device, in response to a first sensor signal provided from the first sensor, and
wherein the storage controller is further configured to control an operation of the second memory device, in response to a second sensor signal provided from the second sensor, and
wherein the storage controller is further configured to switch a mode of the first memory device and the second memory device between a plurality of operating modes, based on the first sensor signal, the second sensor signal, and the strain signal.

13. The storage device of claim 12,
wherein the strain gauge is further configured to measure the physical strain based on a deformation of an electric resistance of the strain gauge.

14. The storage device of claim 12, wherein the strain gauge is located at an edge portion of the active interposer.

15. A storage device, comprising:
a package substrate;
a first semiconductor chip coupled to the package substrate;
a second semiconductor chip coupled to the package substrate;
a third semiconductor chip coupled to the package substrate;
an active interposer which couples the first semiconductor chip, the second semiconductor chip, and the third semiconductor chip with the package substrate using a through-silicon via;
a sensor which is mounted inside the active interposer as a chiplet structure and configured to sense an impact; and
a strain gauge which is mounted inside the active interposer and configured to measure a physical strain based on a deformation of an electric resistance of the strain gauge,
wherein the sensor is further configured to provide a sensor signal of the sensed impact to the third semiconductor chip,
wherein the strain gauge is further configured to provide a strain signal of the measured physical strain to the third semiconductor chip, and
wherein the third semiconductor chip is further configured to control operation of the first semiconductor chip, the second semiconductor chip, and the third semiconductor chip, in response to the sensor signal and the strain signal.

16. The storage device of claim 15, wherein the third semiconductor chip includes a storage controller configured to control the first semiconductor chip, the second semiconductor chip, and the third semiconductor chip, depending on a level of the impact and a level of the physical strain according to the sensor signal and the strain signal.

17. The storage device of claim 15, wherein the first semiconductor chip includes a volatile memory,
wherein the second semiconductor chip includes a nonvolatile memory, and wherein the third semiconductor chip includes a storage controller configured to control the first semiconductor chip and the second semiconductor chip, and store data about the physical strain in the volatile memory, in response to the strain signal of the physical strain.

18. The storage device of claim 15, wherein the first semiconductor chip is placed on a first surface of the package substrate, and wherein the second semiconductor chip and the third semiconductor chip are placed on a second surface opposite to the first surface of the package substrate.

19. The storage device of claim 15, wherein the strain gauge is located at an edge portion of the active interposer.

* * * * *